April 4, 1950     P. C. DAUGERT     2,502,510
SUPPORTING STAND
Filed Feb. 24, 1948     2 Sheets—Sheet 2
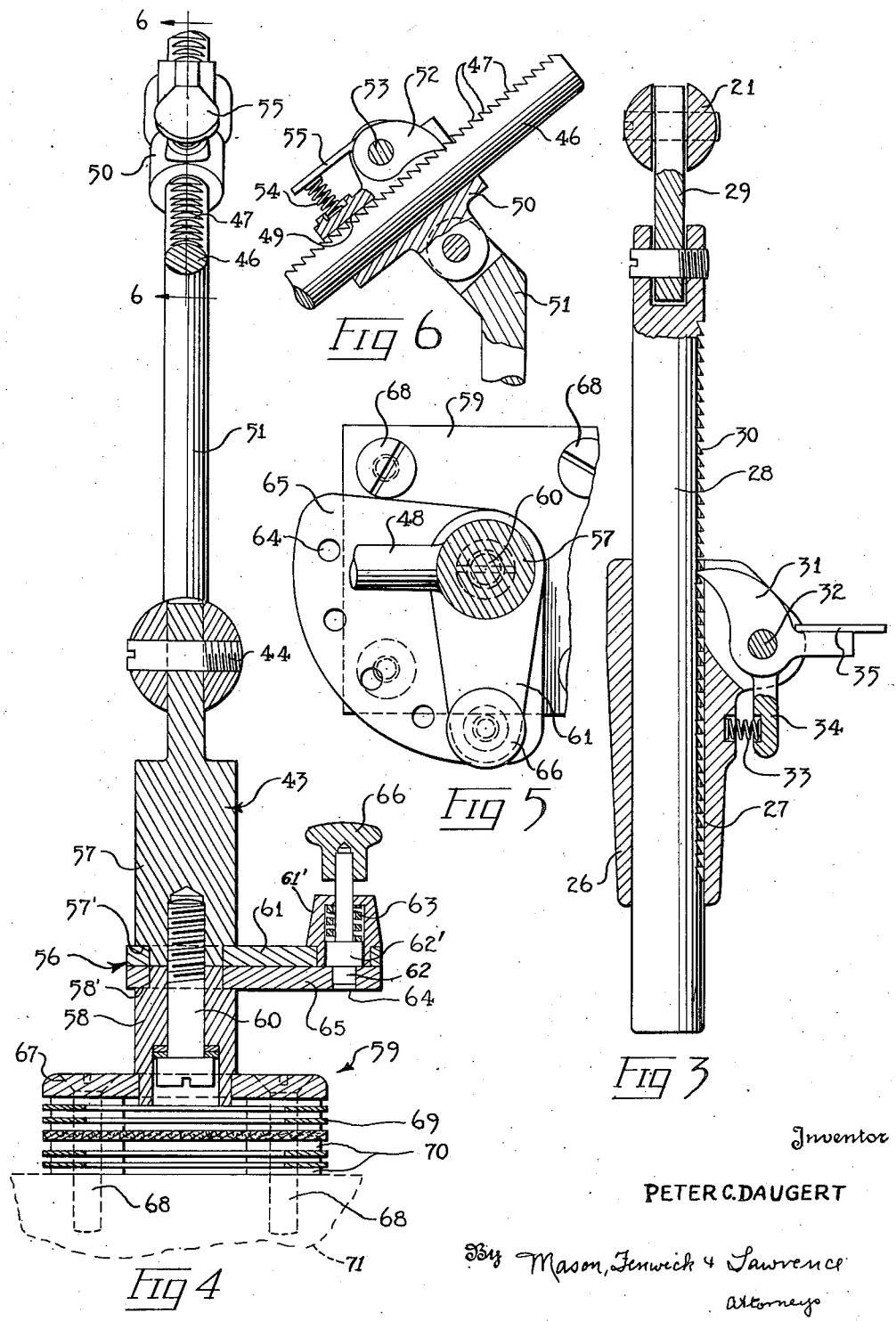
Inventor
PETER C. DAUGERT
By Mason, Fenwick & Lawrence
Attorneys Patented Apr. 4, 1950

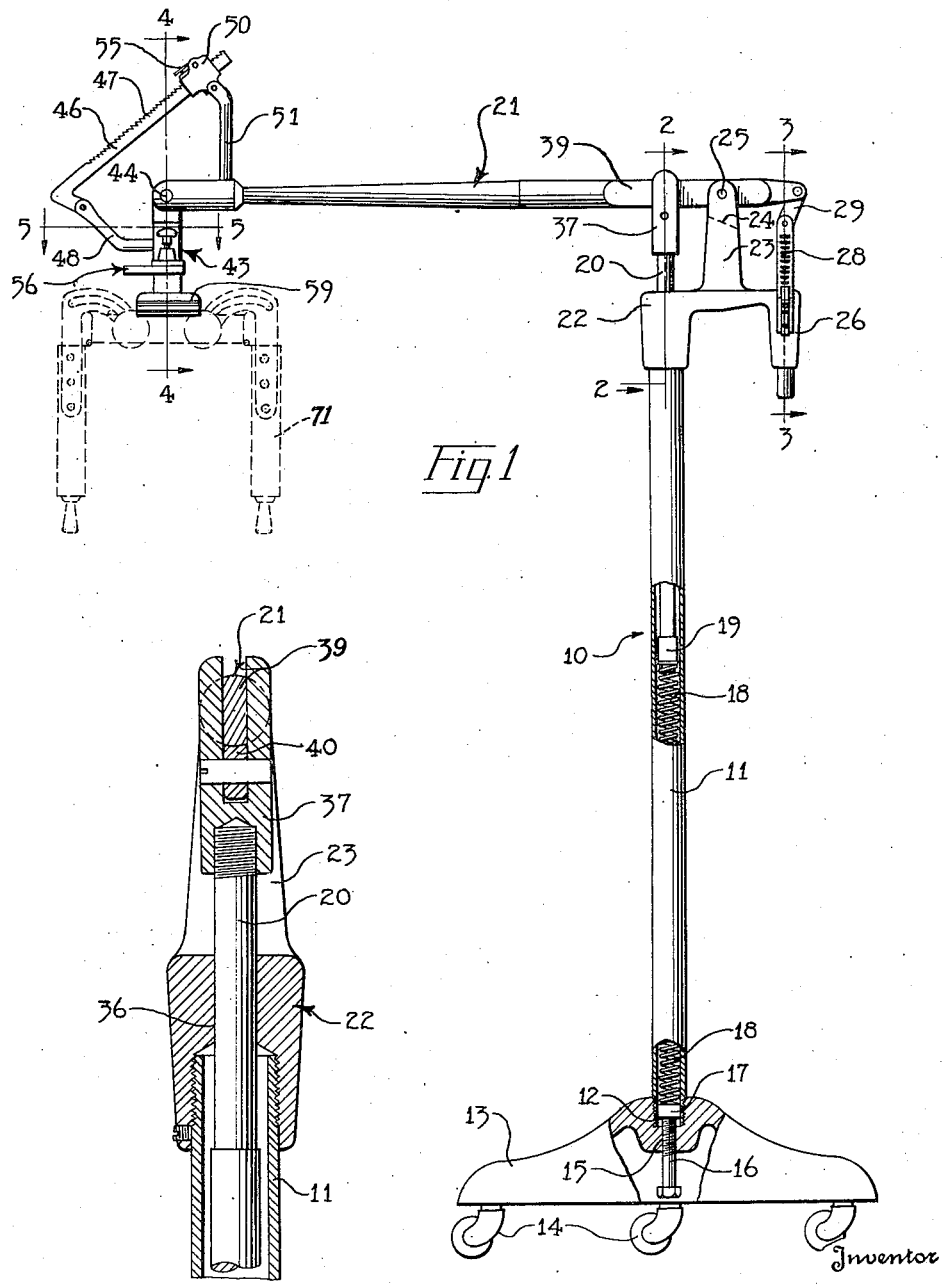

2,502,510

UNITED STATES PATENT OFFICE 2,502,510

SUPPORTING STAND

Peter Charles Daugert, Wilkes-Barre, Pa., assignor to Infra Appliances Corporation, Wilkes-Barre, Pa., a corporation of Delaware Application February 24, 1948, Serial No. 10,390

8 Claims. (Cl. 248—149)

The present invention relates, in general, to supporting stands and, more particularly, to adjustable stands capable of supporting an object for substantially universal movement.

An object of the present invention is the provision of a novel supporting stand which may be manually adjusted to position an object suspended therefrom in any of a plurality of positions relative to the axes of the object, or a plurality of vertical or horizontal axes remote from the object suspended.

Another object of the invention is the provision of a supporting stand permitting substantially universal height position and orientation adjustment of an object suspended therefrom relative to a fixed object and which will automatically maintain the position of adjustment when set.

Still another object of the invention is the provision of a stand for rigidly supporting an object or device in any adjusted position relative to a fixed body, the stand being adjusted to the desired degree by manual pressure applied to the supported object or device whereby the device may be exactly and carefully positioned immediately adjacent or surrounding the fixed body.

It is also an object of the invention to provide such a stand wherein the weight of the object supported and a portion of the supporting structure is compensated for; and the compensation may be varied for the particular object being supported, as desired by the operator.

Other objects, advantages and capabilities of the present invention will become apparent from the following description taken in conjunction with the accompanying drawings which form a part of this specification and show one practical embodiment of the invention.

In the drawings:

Figure 1 is a side view of a supporting stand embodying the features of the present invention, parts being broken in section;

Figure 2 is a vertical transverse sectional view taken on the line 2—2 of Figure 1;

Figure 3 is a vertical transverse sectional view taken on the line 3—3 of Figure 1;

Figure 4 is a vertical sectional view taken on the line 4—4 of Figure 1;

Figure 5 is a horizontal section taken on the line 5—5 of Figure 1; and

Figure 6 is a vertical section taken on the line 6—6 of Figure 4.

The stand of the present invention is of broad application, being designed to support in suspended position any of a plurality of objects which, in use, are required to be readily positionable with relation to a fixed object and readily maintained in that position until readjusted. The stand is particularly useful in positioning various electrical devices, such as illuminating sources for close work, heat sources, work or tool supports, and like applications where a high degree of adjustability in elevation, azimuth and about axes through the object being supported is required. The adjustable supporting stand will be described in connection with a therapeutic oven designed to be positioned immediately adjacent a limb of the human body to be subjected to artificial heat treatment, the stand being particularly useful in following the movements of an oven as it is moved manually and oriented to its desired position adjacent the body member to be treated. It is to be understood, however, that the stand is not limited to such use, the therapeutic application being employed for illustration only.

Referring to the drawings in detail, the stand comprises a pedestal 10, to the upper end of which is pivotally connected a horizontal arm 21, the arm 21 having a second arm 43 pivoted to its outer end. Arm 43 carries appropriate means 59 for connection to a therapeutic oven, or other object, 71 which it is desired to support.

Pedestal 10 consists of a vertically positioned tubular standard 11 which is threaded both at its upper and lower ends. The lower end of the standard is screwed into a threaded socket 12 in a base 13 which is relatively large for stability and is provided with a plurality of casters 14 for ease in moving the stand from place to place. A casting 22 is threaded upon the upper end of standard 11, the casting being provided with an upstanding member 23 bifurcated at its upper end to form a pair of ears 24 between which a flattened portion 39 of the arm 21 is positioned a pin 25 pivotally connecting the arm 21 to the ears 24.

As the arm 21 has its pivotal point near one end with the major portion of the arm projecting forwardly of the pivotal point and the weight of the oven or other object supported by the stand is carried at the forward end of the arm, the weight would make adjustment difficult unless some compensating means is provided. To this end, a plunger 20 is mounted in the standard 11 and projects through the casting 22, the upper end of the plunger being of reduced diameter and having a sliding fit in an opening 36 in casting 22. The top end of the reduced portion is threaded to receive a clevis 37 which carries a roller 40 positioned between its upright arms. Arm 21 rests upon the roller 40 and rides thereon as the arm pivots. The lower end of plunger 20 is enlarged, as at 19, to closely fit within the tubular standard 11 and serve as a guide to maintain the vertical alignment of plunger 20. Beneath plunger 20, and having its upper end bearing against the enlargement 19 is a coiled spring 18. The lower end of spring 18 bears upon a movable plug 17 which is of such size as to closely fit within the lower end of standard 11. The base 13 below socket 12 and in axial alignment therewith is bored and tapped as at 15 to receive a screw 16 which supports plug 17, and upon rotation moves the plug vertically within standard 11 to increase or decrease the compression of spring 18 to the desired extent to counterbalance, or slightly more than counterbalance, the weight of arm 21 and the object carried thereby under normal circumstances.

As the spring is compressed sufficiently to lift arm 21, means are provided to hold the arm in any desired position of upward adjustment. This comprises a rod 28 which is vertically slidable in an opening 27 formed in a boss 26 depending from the rear edge of the casting 22. Rod 28 is provided with a series of ratchet teeth 30 along one side, and a pawl 31 is pivotally connected to the boss 26 by means of a pivot pin 32. Pawl 31 is normally urged into contact with ratchet teeth 30 by means of a spring 33 positioned between the boss 26 and an arm 34 which extends from the pawl. The pawl is also provided with a finger piece 35 which projects beyond the boss so as to be accessible for releasing the pawl from engagement with the ratchet teeth. As rod 28 and plunger 20 are on opposite sides of the pivot 25 for arm 21, the tendency toward upward movement of the plunger under the influence of spring 18 will place a downward bias on rod 28. Ratchet teeth 30 and pawl 31, therefore, are so positioned that rod 28 cannot move downward until the pawl is released from engagement with the teeth. Arm 21 can be moved downward, however, without releasing the pawl, the pawl merely overrunning the ratchet teeth. As soon as downward pressure upon arm 21 is released, pawl 31 will immediately engage one of the teeth 30 and hold the arm in position.

Adjusting arm 21 by the foregoing means raises or lowers oven 71 to position it at a desired height above the floor.

Angular adjustment of the oven in a vertical plane is accomplished by turning arm 43 about its pivotal connection 44 with arm 21. To hold arm 43 in its desired position of adjustment, a second ratchet and pawl mechanism is employed. The arms 21 and 43 are each provided with a projecting mounting post shown at 51 and 48 respectively, the post 48 having a rod 46 pivoted to its end, and the post 51 pivotally supporting a sleeve 50 through the bore 49 of which the rod 46 may slide. Rod 46 is provided with ratchet teeth 47 along one side, and sleeve 50 is slotted along one side and provided with a pair of ears between which a pawl 52 is mounted upon a pin 53 to move through the slot and engage ratchet teeth 47. The pawl has a projecting finger piece 55 by means of which it may be disengaged from the ratchet teeth of the rod 46. A spring 54 is interposed between the finger piece 55 of the pawl and a seat on the sleeve 50 to normally urge the pawl toward engagement with the ratchet teeth. As gravity will tend to pull the oven and arm 43 to a downward position, the ratchet teeth on rod 46 have their holding faces positioned to counteract this movement. In other words, the oven and arm may be moved freely in an upward or clockwise direction as viewed in Figure 1, the pawl 52 overrunning the ratchet teeth 47 but the finger piece 55 must be actuated to release pawl 52 from ratchet teeth 47 before the oven can be swung downwardly.

To permit orientation of the oven about its own axis, arm 43 is divided into two sections 57 and 58, and a swivel connection 56 is interposed between the two sections. Section 57 has its lower end reduced in diameter forming the shoulder 57' and an arm 61 is fitted onto the reduced end of the section against the shoulder 57' where it is welded or otherwise made rigidly secure. Section 58 has its upper end reduced in diameter to form a shoulder 58' and a plate 65 fits over the reduced portion against the shoulder 58' where it is also made secure. Section 58 has an axial bore extending completely through it, the lower portion of the bore being of larger diameter than the upper bore. Section 57 has a similar bore which is threaded extending part way into the section from the lower end. A bolt 60 passes through the bore in section 58 and is threaded into the bore in section 57, the head of the bolt fitting into the enlarged portion of the bore in section 58. When bolt 60 is drawn up, the ends of the sections are drawn together, making a firm connection while permitting section 58 to rotate with respect to section 57. The oven is held in the desired position of orientation by means of latch mechanisms carried by arm 61 and plate 65. Plate 65 is provided with an arcuate series of holes 64, and arm 61 carries a spring bolt 62 adapted to enter the selected hole 64 and prevent relative rotation between the sections of the arm 43. Spring bolt 62 is slidably mounted in a housing 61' on the end of arm 61 and is provided with an enlargement 62' near one end which serves as a stop to prevent the end of the bolt from penetrating too far into the openings 64, and also serves to support one end of a spring 63 which surrounds the bolt and is interposed between the enlargement 62' and the top of the housing 61' to urge the bolt to latching position. A knob 66 is fixed to the top of the bolt for ease in releasing.

The device to be supported at the end of arm 43, such as the oven 71, may be mounted in any suitable manner. The mounting shown in the drawings comprises a plate 67 and a plurality of thin plates 69 mounted on bolts 68, the plates 69 being held in spaced relation by means of washers 70 positioned on bolts 68 between the plates. The bolts 68 project beyond the mounting to be threaded into suitable openings in the oven. Therapeutic ovens frequently generate considerable heat, and in a mounting such as that just described the plates 69 will serve as cooling fins to dissipate the heat before it reaches the supporting stand.

In operation, the desired unit is attached to the coupling 59, and spring 18 is then adjusted by means of screw 16 until the force of the spring is slightly in excess of that necessary to counterbalance the downward thrust of arm 21. The stand is then ready for use. To position the unit, arm 21 is adjusted about pivot 25 to secure the desired height. If the unit is to be moved downward, a simple downward pressure upon arm 21 will position it. If the unit is to be raised, pawl 31 must be disengaged from teeth 30 and spring 18 will lift the arm. The operator's hand upon arm 21 will control its movement, and it may be stopped at any desired point by releasing the pawl 31. After the height is adjusted, the unit may be moved for angular adjustment about the pivot 44, so that it may occupy any position from directly above an object to axial alignment with arm 21. The angular adjustment is maintained by the ratchet and pawl mechanism 50. By lifting knob 66, releasing bolt 62 from the hole 64 in plate 65 with which it is engaged, the unit may be rotated about its own axis to orient it to deliver its heat most effectively. Proper manipulation of the arms of the stand and the swivel 56 will direct the unit in any desired direction.

Although one practical embodiment of the invention has been described and illustrated herein, it is to be understood that many changes may be made from the precise structure disclosed without departing from the scope of the appended claims.

What is claimed is:

1. An adjustable supporting stand adapted for height, angular and orientation adjustment of an object supported therefrom comprising, a vertical standard, a supporting arm pivotally coupled to said standard for vertical angular adjustment of said arm relative to said standard, means to counterbalance said arm, means coupled between said arm and said standard operative to releasably retain said arm against movement from its adjusted position in one direction and to overrun upon angular adjustment of said arm in an opposite direction, mounting means pivotally coupled to said arm at the outer end thereof for angular adjustment of said mounting means in a vertical plane relative to said arm and adapted to be rigidly secured to said object, means coupled between said mounting means and said arm operative to releasably retain said mounting means against movement from its adjusted position due to gravity and to overrun upon manual adjustment of the position of said mounting means against the force of gravity, and a rotary coupling in said mounting means for rotary adjustment of said mounting means and the object mounted thereon relative to the directional axis of said object.

2. An adjustable supporting stand adapted for height, angular and orientation adjustment of an object supported therefrom comprising, a vertical standard, a supporting arm pivotally coupled to said standard for vertical angular adjustment of said arm relative to said standard, resilient means urging said arm upward, ratchet and pawl mechanism for releasably holding said arm in positions of adjustment, mounting means pivotally coupled to said arm for angular adjustment in a vertical plane and adapted to be rigidly secured to said object, ratchet and pawl mechanism between said mounting means and said arm operative to releasably retain said mounting means in its adjusted position against the force of gravity and permit manual adjustment of said mounting head means in an upward direction, and a rotary coupling in said mounting means for rotary adjustment of said mounting means and the object thereon relative to the directional axis of said object.

3. In an adjustable supporting stand, the combination recited in claim 2 wherein latch mechanism is provided for said rotary coupling including a resiliently urged bolt carried by one portion of said coupling and positioned adjacent a plate carried by another portion of said coupling and having a plurality of openings therein, said bolt being manually movable axially to disengage said bolt from said openings to permit rotary positioning of said mounting means.

4. An adjustable supporting stand adapted for height, angular and orientation adjustment of an object supported therefrom comprising, a vertical standard, a supporting arm pivotally coupled to said standard for angular adjustment of said arm in a vertical plane relative to said standard, resilient means urging said arm upward, means coupled between said vertical standard and said arm to releasably retain said arm against upward movement and to overrun upon adjustment of said arm downward under manual pressure, mounting means for mounting said object pivotally coupled to said arm for angular adjustment in a vertical plane and provided with unidirectional positioning means coupled with said arm to releasably retain said mounting means against downward displacement from its adjusted position, and a rotary coupling in said mounting means for rotary adjustment of the object mounted on said mounting means.

5. An adjustable supporting stand adapted for height, angular and orientation adjustment of an object supported thereon comprising, a vertical standard, a supporting arm pivotally coupled to said vertical standard, resilient means urging said arm upward, means coupled between said vertical standard and said arm to normally retain said arm against upward movement and permit adjustment of the position of said arm downward under manual pressure, mounting means pivotally coupled to said arm at the outer end thereof for angular adjustment of said mounting means in a vertical plane relative to said arm and adapted to be rigidly secured to said object, means releasably intercoupled between said mounting means and said arm operative to releasably retain said mounting means in its adjusted position against the force of gravity and permit manual adjustment of said mounting means upward, and a rotary coupling in said mounting means for rotary adjustment of said mounting means and the object secured thereto relative to the directional axis of said object.

6. An adjustable stand for positioning an object carried thereby comprising, a pedestal, a horizontal arm, and a vertical arm, said horizontal arm being pivoted to said pedestal for movement in a vertical plane, said vertical arm being pivoted to said horizontal arm for movement in a vertical plane and having means for attachment to the object to be carried, means interposed between the ends of said vertical arm to permit rotary movement of said object attaching means about the axis of the vertical arm, means for releasably holding the horizontal arm in positions of angular adjustment with respect to said pedestal, means for releasably holding said vertical arm in angular positions of adjustment with respect to said horizontal arm, and means for releasably holding said object attaching means in rotary positions of adjustment with respect to the axis of said vertical arm.

7. An adjustable stand for positioning an object carried thereby comprising, a pedestal, a horizontal arm, and a vertical arm, said horizontal arm being pivoted to said pedestal for movement in a vertical plane, said vertical arm being pivoted to said horizontal arm for movement in a vertical plane and having means for attachment to the object to be carried, means interposed between the ends of said vertical arm to permit rotary movement of said object, attaching means about the axis of the vertical arm, a spring-pressed rod carried by said pedestal to bear against the underside of said horizontal arm between the pivotal connections of said horizontal arm with said pedestal and said vertical arm to offset the weight of said horizontal arm said vertical arm and the object carried thereby, ratchet and pawl mechanism between said pedestal and said horizontal arm to releasably hold said horizontal arm against movement under the influence of said spring-pressed rod but permit free movement of said horizontal arm in an opposite direction under manual pressure, ratchet and pawl mechanism between said horizontal arm and said vertical arm to releasably hold said vertical arm against movement in the direction of the pull of gravity but permit free movement in an opposite direction under manual pressure, and means for releasably holding said object attaching means in rotary positions of adjustment with respect to the axis of said vertical arm.

8. In an adjustable stand for positioning an object carried thereby, a pedestal, a horizontal arm pivoted to the pedestal for movement in a vertical plane, a vertical arm adapted for attachment to the object to be carried pivoted to the horizontal arm for movement in a vertical plane, a spring-pressed rod carried by said pedestal to bear against the underside of said horizontal arm between the pivotal connections of said horizontal arm with said pedestal and said vertical arm to offset the weight of said horizontal arm, said vertical arm and the object carried thereby, ratchet and pawl mechanism between said pedestal and said horizontal arm to releasably hold said horizontal arm against movement under the influence of said spring-pressed rod but permit free movement of said horizontal arm in an opposite direction under manual pressure, and ratchet and pawl mechanism between said horizontal arm and said vertical arm to releasably hold said vertical arm against movement in the direction of the pull of gravity but permit free movement in an opposite direction under manual pressure.

PETER CHARLES DAUGERT.

REFERENCES CITED

The following references are of record in the file of this patent:

UNITED STATES PATENTS

| Number | Name | Date |
|---|---|---|
| 1,556,917 | Dee | Oct. 13, 1925 |
| 1,638,939 | Koenigkramer | Aug. 16, 1927 |
| 2,171,028 | Gilb | Aug. 29, 1939 |
| 2,416,910 | Crosby et al. | Mar. 4, 1947 |
| 2,459,722 | Price | Jan. 18, 1949 |